(12) United States Patent
Townley

(10) Patent No.: US 9,988,562 B2
(45) Date of Patent: Jun. 5, 2018

(54) MULTI-PART ADHESIVE AND ITS METHOD OF MANUFACTURE

(71) Applicant: MIX 14 Ltd., Letchworth, Hertfordshire (GB)

(72) Inventor: Gary Townley, Letchworth (GB)

(73) Assignee: MIX 14 Ltd., Letchworth (GB)

( * ) Notice: Subject to any disclaimer, the term of this patent is extended or adjusted under 35 U.S.C. 154(b) by 77 days.

(21) Appl. No.: 15/024,353

(22) PCT Filed: Sep. 23, 2014

(86) PCT No.: PCT/GB2014/052883
§ 371 (c)(1),
(2) Date: Mar. 23, 2016

(87) PCT Pub. No.: WO2015/040429
PCT Pub. Date: Mar. 26, 2015

(65) Prior Publication Data
US 2016/0237327 A1 Aug. 18, 2016

(30) Foreign Application Priority Data
Sep. 23, 2013 (GB) .................................. 1316892.7

(51) Int. Cl.
| | | |
|---|---|---|
| *C09J 133/12* | (2006.01) | |
| *C09J 11/06* | (2006.01) | |
| *C09D 133/06* | (2006.01) | |
| *C08K 5/00* | (2006.01) | |
| *C08K 5/02* | (2006.01) | |
| *C08K 5/09* | (2006.01) | |

(52) U.S. Cl.
CPC .......... *C09J 133/12* (2013.01); *C09D 133/06* (2013.01); *C09J 11/06* (2013.01); *C08K 5/0041* (2013.01); *C08K 5/0066* (2013.01); *C08K 5/02* (2013.01); *C08K 5/09* (2013.01)

(58) Field of Classification Search
CPC ....... C09J 133/12; C09J 11/06; C09D 133/06; C08K 5/0041; C08K 5/02; C08K 5/0066; C08K 5/09
See application file for complete search history.

(56) References Cited

U.S. PATENT DOCUMENTS

| | | |
|---|---|---|
| 5,171,813 A | 12/1992 | Patel et al. |
| 2009/0018254 A1 | 1/2009 | Huster et al. |
| 2010/0266859 A1* | 10/2010 | Abe ....................... C09J 7/0246 428/522 |
| 2012/0263905 A1 | 10/2012 | Park |
| 2013/0009365 A1* | 1/2013 | Kabutoya .............. F16J 15/022 277/312 |

FOREIGN PATENT DOCUMENTS

| | | |
|---|---|---|
| CN | 102559120 A | 7/2012 |
| WO | WO 00/09322 A1 | 2/2000 |
| WO | WO 02/070623 A2 | 9/2002 |

OTHER PUBLICATIONS

International Search Report and Written Opinion dated Apr. 15, 2015 in connection with PCT/GB2014/052883.
Search Report dated Mar. 18, 2014 in connection with GB1316892.7.

* cited by examiner

*Primary Examiner* — Robert Jones, Jr.
(74) *Attorney, Agent, or Firm* — Wolf, Greenfield & Sacks, P.C.

(57) ABSTRACT

Provided herein, generally, are colored two-part adhesives, more particularly, in some embodiments, (meth)acrylate based two-part adhesives suitable for, but not limited to, use in repairing aircraft parts. The adhesives, in some embodiments, comprise a colored first component and a second component, wherein the colored first component comprises i) a polymeric resin base composition, ii) a flame-retardant compound, and optional synergist, iii) an acrylic paint, and iv) dispersant additive; and the second component comprises v) a curing agent.

18 Claims, No Drawings

MULTI-PART ADHESIVE AND ITS METHOD OF MANUFACTURE

CROSS REFERENCE TO RELATED APPLICATIONS

This application is the national phase of International Application No. PCT/GB2014/052883, titled "MULTI-PART ADHESIVE AND ITS METHOD OF MANUFACTURE", filed on Sep. 23, 2014, which claims priority to United Kingdom Patent Application No. 1316892.7, filed on Sep. 23, 2013, the entire contents of each of which are incorporated herein by reference.

CROSS REFERENCE TO RELATED APPLICATIONS

This application is the national phase of International Application No. PCT/GB2014/052883, titled "MULTI-PART ADHESIVE AND ITS METHOD OF MANUFACTURE", filed on Sep. 23, 2014, which claims priority to United Kingdom Patent Application No. 1316892.7, filed on Sep. 23, 2013, the entire contents of each of which are incorporated herein by reference.

The invention relates generally to multi-part adhesives, more particularly, (meth)acrylate-based multi-part adhesives suitable for, but not limited to, use in repairing aircraft and aircraft parts. The invention further relates to a method of manufacture of the multi-part adhesive, and colouring the multi-part adhesive.

Multi-part adhesive compositions are known in the art to be useful for a variety of adhesive, coating, filling, repair and related applications. Multi-part adhesives comprise two or more components, which when separate do not possess adhesive properties, but when mixed, chemically react via a polymerisation based cross-linking mechanism, to form a hardened plastic. This process is known as curing.

Many multi-part adhesives are commercially available, for example, epoxy or polyurethane resins. A particularly useful group of multi-part adhesives comprise mixtures of dissolved or dispersed polymers in liquid acrylate monomers (acrylic adhesives). Such compositions have favourable properties in terms of their bond strength, suitability for adhesion to a wide variety of materials, and fast curing. Acrylic adhesives composed of (meth)acrylate esters are preferred monomers for use in these adhesives due to their wide commercial availability, their low cost, and favourable properties in the hardened plastic; methacrylates being preferred over acrylates due primarily to the unpleasant odour of the acrylates.

It is known, however, that unmodified (meth)acrylate adhesives cure to form hard, brittle plastics. Most (meth)acrylate adhesives can be formulated with modifiers to overcome this deficiency, while it is also known that the cure time/temperature can also affect the final properties of the cured product.

A further disadvantage of unmodified (meth)acrylate adhesives is that the (meth)acrylate resin component does not possess a stable white base colour from which to reproducibly colour-match the final cured product to a particular application.

The base components of a typical (meth)acrylate adhesive are generally not strongly coloured. Therefore, minor impurities, such as small quantities of metal oxides, cause variation in the base colour of the (meth)acrylate resin. This variation in colour of the base material presents a significant problem to those attempting to produce a (meth)acrylate adhesive for use to manufacture or repair a product where it would be desirable, primarily for aesthetic reasons, to achieve a close match in colour to the neighbouring components. A similar problem exists when a second batch of a (meth)acrylate adhesive is required to match a batch made previously.

To reproducibly colour-match the (meth)acrylate adhesive effectively, the ability to predict the quantity and/or shade of colourant required to achieve a specific final cured adhesive colour is necessary. This is made significantly more difficult, if not impossible, without a stable, preferably white, base colour from which to begin.

The ability to precisely colour-match a (meth)acrylate adhesive has particular use in repairing cracked or otherwise damaged hard plastics, which are widely used across many fields of industry. Of particular importance is in the repair of thermosetting plastics used in transportation, for example, vehicle bumpers and interior trims, and in particular in repairing aircraft and aircraft parts.

The interior components of aircraft have to meet stringent design and regulatory requirements. The same is true of any material used to repair them which remains part of the aircraft. An example of one such test is the 12 second vertical burns test according to ACI WI 2001, meeting the requirements of CS 25.853a, Appendix F, Part 1 (A) 1 (ii).

Most commonly used (meth)acrylate adhesives, do not meet the requirements for use in aircraft interiors, due either to their physical properties (hardness, brittleness, odour etc.), or due to the fact that they do not conform to the flammability requirements imposed by most civil aviation authorities. For this reason, cracked or damaged internal aircraft components are currently often replaced rather than repaired.

It would therefore be advantageous to identify an acrylate multi-part adhesive which would overcome the deficiencies of the prior art, i.e. to provide an acrylate multi-part adhesive with acceptable structural properties in the final cured plastic, while being able to be reproducibly colour-matched so it may be used in, for example, the aviation industry. It is an object of the invention to address these and/or at least one other problem associated with the prior art.

From a first aspect, the invention resides in a coloured two-part adhesive composition, comprising a coloured first component and a second component, wherein the coloured first component comprises:
  i. a polymeric resin base composition;
  ii. a flame-retardant compound, and optional synergist;
  iii. an acrylic paint; and
  iv. dispersant additive
and the second component comprises:
  v. a curing agent.

The term "coloured" is to be understood in this context to mean a colour which is not natural or inherent. The addition of pigments, suspended in the acrylic polymer emulsion described above, to the first component of the two-part adhesive provides a means by which the final cured product may be coloured. It will be appreciated that the mixing of the pigments in the acrylic paint and the natural colour of the polymeric resin base may result in a combined visible colour which is different from either of the starting material colours, and that the curing process may result in colour variation between the acrylic paint, the coloured first part of the two-part adhesive composition, and the final cured coloured adhesive composition.

Preferably, the polymeric resin base is present in the adhesive composition in the range from 50% to 90% by weight, more preferably 70 to 90% by weight, most preferably 80 to 90% by weight, with respect to the total weight of the first component of the adhesive composition.

The flame-retardant composition is present in the first component of the adhesive composition preferably in the range from 1 to 50% by weight, more preferably 5 to 40% by weight, most preferably 10 to 30% by weight, with respect to the total weight of the first component of the adhesive composition.

The term "flame-retardant compound" in this context is to be understood to mean a compound which imparts resistance to catching fire to the material in which is present. This is to be understood to include inhibition. This effect may be caused by, but is not limited to, endothermic degradation (removing heat from the substrate causing the material to cool) or gas phase radical quenching (thermal degradation causing release of halides which may react with radicals in the flame to lower the potential of the radical oxidation reactions present in combustion to propagate).

In embodiments where the optional synergist is present, it is present in the first component of the adhesive composition in the range of 0.01 to 10%, preferably 1 to 8%, more preferably 3 to 7% by weight, with respect to the total weight of the first component of the adhesive composition.

The term "synergist" is to be understood to mean a compound which enhances the efficacy of the flame-retardant, i.e. the flame-retardant effect of a material where a flame-retardant compound and a synergist are both present will have a greater flame-retardant effect than a material where each is present separately.

The flame-retardant compound alone, or the flame-retardant compound and the synergist act to mitigate the propensity of the adhesive composition, once cured, to be flammable. The term "mitigate" as used herein ideally also embraces prevention.

The term "flammable" or "inflammable" should be understood to mean easily ignited or capable of burning, whilst the antonym "non-flammable" should be understood to mean not easily ignited or incapable of burning. In the present context it may be used, without limitation, to indicate whether those regulations relating to the flammability requirements for airworthiness in Transport Category Airplanes in Part 25 of the US Federal Aviation Regulations (FARs) for components and parts, and materials used to repair interior components, are met.

In one embodiment, the coloured first and second components of the two-part adhesive composition are mixed in a 1:1 v/v ratio.

It will be appreciated that other ratios of mixing of the two components are encompassed by the invention, for example, a ratio of from 3:1 to 1:3 v/v, preferably a ratio from 2:1 to 1:2 v/v, more preferably a ratio from 1.5:1 to 1:1.5 v/v may be used.

In one embodiment, the polymeric resin base composition is an acrylic polymer, preferably the polymeric resin base composition is poly methylmethacrylate (PMMA), more preferably, the polymeric resin base composition is medical grade PMMA. Medical grade PMMA typically has a grain size with an upper limit of preferably 0.01 µm, and a lower limit of preferably 0.0005 µm, more preferably 0.0015 µm, and most preferably 0.0025 µm. Suitably, the grain size may be between 0.0005 µm and 0.01 µm, more preferably between 0.0015 µm and 0.0095 µm, and most preferably between 0.0025 µm and 0.0085 µm.

The grain size of the medical grade PMMA powder is generally larger than non-medical grade PMMA powder. It is believed that a larger grain size of PMMA prolongs the cure time of adhesive compositions in which they are incorporated, with a resultant decrease in the heat released during the exothermic curing reaction(s). This effect can be used to optimise the properties of the final cured material.

Medical grade PMMA is also commercially available substantially free of metal oxides. The Applicant has found that metal oxides cause discolouration of the both the first part of the two part adhesive composition, and the resultant final cured material. The lack of metal oxides in the PMMA result in a reproducible base colour of the first part of the two part adhesive composition.

Medical grade PMMA is commercially available, such as from Prevest Denpor Ltd (Jammu, India), and comprises PMMA powder (>98%, at greater than 99% purity) and <2% benzoyl peroxide. It will be appreciated that other medical grade PMMA's may be used in the invention.

As used herein, the term "curing agent" is to be understood to mean a substance which causes hardening of the adhesive when mixed with a polymeric resin base. Other terms, for example, "cross-linking agent", "hardener" or "catalyst" may be used interchangeably with the term "curing agent" depending on the context.

In a preferred adhesive composition, the curing agent is an acrylic monomer. Preferably the acrylic monomer is an acrylic acid or an acrylic ester, more preferably, methyl methacrylate or ethyl methacrylate.

The flame-retardant compound is preferably an halogenated compound, more preferably, an organochlorine, an organobromine, or an organofluorine compound.

When the halogenated compound is an organochlorine compound, it is preferably one of chlorendic acid, and derivatives thereof or a chlorinated paraffin.

When the halogenated compound is an organobromine compound, it is preferably one of decabromodiphenyl ether (decaBDE); decabromodiphenyl ethane; brominated polystyrenes; brominated carbonate oligomers (BCOs); brominated epoxy oligomers (BEOs); tetrabromophthalic anyhydride, tetrabromobisphenol A (TBBPA); and hexabromocyclododecane (HBCD), more preferably tetrabromobisphenol A (TBBPA).

When the halogenated compound is an organofluorine compound, it is preferably nonafluorobutane-1-sulfonic acid potassium salt.

The synergist, where present, is preferably selected from the group consisting of an oxide of antimony and derivatives thereof; and aluminium hydroxide, more preferably the synergist is antimony trioxide.

Antimony trioxide, in its substantially pure form, is a white solid at room temperature, which when mixed in the first part of the two-part adhesive composition imparts a reproducibly white base colour to the mixture.

The term "acrylic paint" is a widely used generic term for pigments of varying colour suspended as an emulsion in an acrylic polymer liquid. The acrylic paint may be in the form of a liquid or a paste. The acrylic paint may be diluted with water or modified with acrylic gels, media, or pastes. While all forms of acrylic paint are contemplated for use in the invention, without limitation, the use of undiluted acrylic paint (i.e. 100% acrylic paint) is preferred. It will be appreciated that all colours of acrylic paints are contemplated for use in the invention.

In one embodiment, the acrylic paint is present in the coloured first component of the two-part adhesive composition in the range from 1% to 30% by weight, preferably, 1 to 20% by weight, most preferably 5 to 10% with respect to the total weight of the coloured first component of the two-part adhesive composition.

The term "dispersant additive" in this context is to be understood to mean a substance which allows the colour of the acrylic paint to disperse more evenly with the polymeric resin base composition. Dispersant additives which are known to have flame-retardant properties, such as ammonium bromide are contemplated, as are dispersant additives which do not possess flame-retardant properties.

Preferably, the dispersant additive is present in the coloured first component of the two-part adhesive composition in the range from 1% to 50% by weight, more preferably, 5 to 40% by weight, most preferably 5 to 20% by weight, with respect to the total weight of the coloured first component of the two-part adhesive composition.

Suitably, the dispersant additive is ammonium bromide as a solution in water, at a concentration of from 1 to 20 wt %, preferably 5 to 15 wt %, more preferably 5 to 10 wt % with respect to the total weight of the solution.

From a second aspect, the invention resides in a method of formulating a coloured adhesive composition comprising:
 i. preparing a first component of the two-part adhesive composition comprising mixing a polymeric resin base, a flame retardant compound, and optionally, a synergist;
 ii. preparing a second component of the two-part adhesive composition comprising a curing agent;
 iii. adding acrylic paint and a dispersant additive to the first component of the two-part adhesive composition of step (i) to form a coloured first component of the two-part adhesive composition; and
 iv. mixing the coloured first component and the second component immediately prior to use to produce the coloured adhesive composition.

It will be appreciated that "immediately prior" is to be understood to encompass a time period shortly before the following activity, and is not limited to "at once" or "instantly".

The method of mixing the polymeric resin base, the flame retardant compound and the synergist, where present in the first component, may be by any suitable means. In one embodiment, mixing is achieved by high energy ball milling. Preferably, high energy ball milling is achieved at a rotation rate in a range of about 50 rpm to about 220 rpm, more preferably, at about 145 rpm.

Preferably, mixing by the high energy ball of the polymeric resin base, the flame retardant compound and the synergist, where present in the first component, is continued for between 1 and 24 hours, preferably between 8 and 12 hours, more preferably for approximately 9 hours.

The acrylic paint and dispersant additive of step (iii) may be added directly to the first part of the two-part adhesive composition; alternatively, the acrylic paint and the dispersant additive of step (iii) are pre-mixed prior to adding to the first component of the two-part adhesive composition of step (i). Other means of combining the acrylic paint and the dispersant additive with the two-part adhesive composition are contemplated.

As the acrylic paint becomes part of the structure of the final cured adhesive composition, either by covalent means through chemical reaction with one or more of the other components, or through non-covalent means via incorporation into the three-dimensional structural matrix, it has the ability to affect the final properties of the cured material, in particular, the flexural strength. Due to the physical and chemical differences between different colours of acrylic paint, for example in the pigments and the liquid acrylic base used, this effect can vary. This approach may be used to optimise the final properties of the cured coloured adhesive composition, in situations where colour-matching is of lesser importance.

EXAMPLES

Example 1—Preparation of First Component (1)

300 grams of poly methyl methacrylate (PMMA) powder (medical grade, ex. Prevest Denpor Ltd) was dispensed into a clean container. To this were added 60 grams of tetrabromobisphenol A (TBBPA) (ex. Tokyo Chemical Industry Ltd., Oxford) and 15 grams of antimony trioxide (ex. Tokyo Chemical Industry Ltd., Oxford).

The mixture was then subjected to high energy ball mixing for approx. 9 hours which afforded the first part of the two-part adhesive as a fine powder. After mixing the white composition was ready to colour.

Example 2—Preparation of First Component (2)

300 grams of poly methyl methacrylate (PMMA) powder (medical grade, ex. Prevest Denpor Ltd) was dispensed into a clean container. To this were added 45 grams of tetrabromobisphenol A (TBBPA) (ex. Tokyo Chemical Industry Ltd., Oxford) and 15 grams of antimony trioxide (ex. Tokyo Chemical Industry Ltd., Oxford).

The mixture was then subjected to high energy ball mixing for approx. 9 hours which afforded the first part of the two-part adhesive as a fine powder. After mixing the white composition was ready to colour.

Example 3—Preparation of Coloured Two-Part Adhesive (1)

Preparation of First Component 100 grams of poly methyl methacrylate (PMMA) powder (medical grade, ex. Prevest Denpor Ltd) was dispensed into a clean container. To this were added 15 grams of tetrabromobisphenol A (TBBPA) (ex. Tokyo Chemical Industry Ltd., Oxford) and 8 grams of antimony trioxide (ex. Tokyo Chemical Industry Ltd., Oxford).

The mixture was then subjected to high energy ball mixing for approx. 9 hours which afforded the first part of the two-part adhesive as a fine powder. After mixing the white composition was ready to colour.

Preparation of Colour Mix Composition 8 grams of acrylic paint was mixed with 40 grams of ammonium bromide solution (5-10 wt % in water; trade name: Flamex PA, ex. Rosco Laboratories Inc.).

Preparation of Coloured First Part of Two-Part Adhesive

The colour mix composition prepared as detailed above was added to the prepared first part of two-part adhesive and mixed until a uniformly coloured mixture is achieved.

Preparation of Two-Part Adhesive

To this fine powder was added methyl methacrylate (ex. Tokyo Chemical Industry Ltd., Oxford) to form a paste which solidified (cured) on standing.

Example 4—Preparation of Coloured Two-Part Adhesive (2)

Preparation of First Component 50 grams of poly methyl methacrylate (PMMA) powder (medical grade, ex. Prevest Denpor Ltd) was dispensed into a clean container. To this were added 6 grams of tetrabromobisphenol A (TBBPA) (ex. Tokyo Chemical Industry Ltd., Oxford) and 3 grams of antimony trioxide (ex. Tokyo Chemical Industry Ltd., Oxford).

The mixture was then subjected to high energy ball mixing for approx. 9 hours which afforded the first part of the two-part adhesive as a fine powder. After mixing the white composition was ready to colour.

Directly to this fine powder was added 5 grams of grey acrylic paint was added to 10 grams of ammonium bromide (5-10 wt % in water; trade name: Flamex PA, ex. Rosco Laboratories Inc.).

This mixture was then dried until a loose powder was afforded.

The coloured two-part adhesive was then prepared as in Example 3 above.

Example 5—Preparation of Coloured Two-Part Adhesive (3)

Preparation of First Component 50 grams of poly methyl methacrylate (PMMA) powder (medical grade, ex. Prevest Denpor Ltd) was dispensed into a clean container. To this were added 6 grams of tetrabromobisphenol A (TBBPA) (ex. Tokyo Chemical Industry Ltd., Oxford) and 3 grams of antimony trioxide (ex. Tokyo Chemical Industry Ltd., Oxford).

The mixture was then subjected to high energy ball mixing for approx. 9 hours which afforded the first part of the two-part adhesive as a fine powder. After mixing the white composition was ready to colour.

Directly to this fine powder were added 3 grams of acrylic paint and 5 grams of ammonium bromide solution (5-10 wt % in water; trade name: Flamex PA, ex. Rosco Laboratories Inc.).

This mixture was then dried until a loose powder was afforded.

The coloured two-part adhesive was then prepared as in Example 3 above.

Example 6—Preparation of Coloured Two-Part Adhesive (4)

Preparation of First Component 50 grams of poly methyl methacrylate (PMMA) powder (medical grade, ex. Prevest Denpor Ltd) was dispensed into a clean container. To this were added 6 grams of tetrabromobisphenol A (TBBPA) (ex. Tokyo Chemical Industry Ltd., Oxford) and 3 grams of antimony trioxide (ex. Tokyo Chemical Industry Ltd., Oxford).

The mixture was then subjected to high energy ball mixing for approx. 9 hours which afforded the first part of the two-part adhesive as a fine powder. After mixing the white composition was ready to colour.

Preparation of Colour Mix Composition 3 grams of dark green acrylic paint was mixed with 5 grams of ammonium bromide solution (5-10 wt % in water; trade name: Flamex PA, ex. Rosco Laboratories Inc.).

Preparation of Coloured First Part of Two-Part Adhesive

The colour mix composition prepared as above was added to the prepared first part of two-part adhesive and mixed until a uniformly coloured mixture is achieved.

Preparation of Two-Part Adhesive

The coloured two-part adhesive was then prepared as in Example 3 above.

Example 7—Preparation of Coloured Two-Part Adhesive (5)

Preparation of First Component 50 grams of poly methyl methacrylate (PMMA) powder (medical grade, ex. Prevest Denpor Ltd) was dispensed into a clean container. To this were added 6 grams of tetrabromobisphenol A (TBBPA) (ex. Tokyo Chemical Industry Ltd., Oxford) and 3 grams of antimony trioxide (ex. Tokyo Chemical Industry Ltd., Oxford).

The mixture was then subjected to high energy ball mixing for approx. 9 hours which afforded the first part of the two-part adhesive as a fine powder. After mixing the white composition was ready to colour.

Directly to this fine powder was added 5 grams of dark green acrylic paint was added to 5 grams of ammonium bromide solution (5-10 wt % in water; trade name: Flamex PA, ex. Rosco Laboratories Inc.).

This mixture was then dried until a loose powder was afforded.

The coloured two-part adhesive was then prepared as in Example 3 above.

Testing

A representative example of the cured adhesives prepared as in Examples 1 to 7 passed a 12 second vertical burns test according to ACI WI 2001, meeting the requirements of CS 25.853a, Appendix F, Part 1 (A) 1 (ii).

The invention claimed is:
1. A coloured two-part adhesive composition, comprising a coloured first component and a second component, wherein the coloured first component comprises:
   i. a polymeric resin base composition;
   ii. a flame-retardant compound with or without a synergist;
   iii. an acrylic paint; and
   iv. dispersant additive
and the second component comprises:
   v. a curing agent;
   wherein the polymeric resin base is present in the adhesive composition in the range from 50% to 90% by weight, with respect to the total weight of the first component of the adhesive composition.

2. A coloured two-part adhesive according to claim 1, wherein the flame-retardant compound is present in the range from 1 to 50% by weight, with respect to the total weight of the first component of the adhesive composition.

3. A coloured two-part adhesive composition according to claim 1, wherein the synergist is present in the range of 0.01 to 10% by weight, with respect to the total weight of the first component of the adhesive composition.

4. A coloured two-part adhesive composition according to claim 1 wherein the first component and the second component are mixed in a 1:1 ratio.

5. A coloured two-part adhesive composition according to claim 1, wherein the polymeric resin base composition is an acrylic polymer.

6. A coloured two-part adhesive composition according to claim 5, wherein the polymeric resin base composition is poly methylmethacrylate (PMMA).

7. A coloured two-part adhesive composition according to claim 6, wherein the polymeric resin base composition is medical grade poly methylmethacrylate (PMMA).

8. A coloured two-part adhesive composition according to claim 7, wherein the medical grade poly methylmethacrylate (PMMA) has a grain size of from 0.0005 µm to 0.01 µm.

9. A coloured two-part adhesive composition according to claim 1 wherein the curing agent is an acrylic monomer.

10. A coloured two-part adhesive composition comprising a coloured first component and a second component, wherein the coloured first component comprises:
   i. a polymeric resin base composition;
   ii. a flame-retardant compound with or without a synergist;
   iii. an acrylic paint; and
   iv. dispersant additive
and the second component comprises:
   v. a curing agent;
wherein the flame-retardant compound is an halogenated compound.

11. A coloured two-part adhesive composition according to claim 1 wherein the synergist is selected from the group consisting of an oxide of antimony and derivatives thereof; and aluminium hydroxide.

12. A coloured two-part adhesive composition according to claim 1, wherein the acrylic paint is present in the coloured first component of the two-part adhesive composition in the range from 1% to 30% by weight, with respect to the total weight of the coloured first component of the two-part adhesive composition.

13. A coloured two-part adhesive composition according to claim 1, wherein the dispersant additive is present in the in the coloured first component of the two-part adhesive composition in the range from 1% to 50% by weight, with respect to the total weight of the coloured first component.

14. A method of formulating a coloured adhesive composition comprising:
   i. preparing a first component of the two-part adhesive composition comprising mixing a polymeric resin base, a flame retardant compound with or without a synergist;
   ii. preparing a second component of the two-part adhesive composition comprising a curing agent;
   iii. adding acrylic paint and a dispersant additive to the first component of the two-part adhesive composition of step (i) to form a coloured first component of the two-part adhesive composition; and
   iv. mixing the coloured first component and the second component immediately prior to use to produce the coloured adhesive composition.

15. A method of formulating a coloured adhesive composition according to claim 14, wherein the polymeric resin base, the flame retardant compound and the synergist, where present, in the first component are subjected to high energy ball milling at a range of about 50 rpm to about 220 rpm.

16. A method of formulating a coloured adhesive composition according to claim 14, wherein the acrylic paint and the dispersant additive of step (iii) is pre-mixed prior to adding to the first component of the two-part adhesive composition of step (i).

17. A method of formulating a coloured adhesive composition according to claim 14, wherein the acrylic paint is present in the coloured first component of the two-part adhesive composition in the range from 1% to 40% by weight, with respect to the total weight of the coloured first component of the two-part adhesive composition.

18. A method of formulating a coloured adhesive composition according to claim 14, wherein the dispersant additive is present in the in the coloured first component of the two-part adhesive composition in the range from 1% to 50% by weight, with respect to the total weight of the coloured first component of the two-part adhesive composition.

* * * * *